United States Patent
Stepp et al.

(10) Patent No.: US 8,039,426 B2
(45) Date of Patent: Oct. 18, 2011

(54) METHOD FOR HYDROLYZING METALLIC SALTS WITH EMULSIONS

(75) Inventors: Michael Stepp, Ueberackern (AT); Uwe Paetzold, Burghausen (DE); Christian Schierlinger, Julbach (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 12/990,257

(22) PCT Filed: Apr. 29, 2009

(86) PCT No.: PCT/EP2009/055217
§ 371 (c)(1),
(2), (4) Date: Oct. 29, 2010

(87) PCT Pub. No.: WO2009/135795
PCT Pub. Date: Nov. 12, 2009

(65) Prior Publication Data
US 2011/0046031 A1    Feb. 24, 2011

(30) Foreign Application Priority Data
May 6, 2008   (DE) .......................... 10 2008 001 576

(51) Int. Cl.
*C23G 5/06*    (2006.01)

(52) U.S. Cl. ........................ 510/251; 510/245; 510/247

(58) Field of Classification Search .................. 510/245, 510/247, 251
See application file for complete search history.

(56) References Cited

U.S. PATENT DOCUMENTS

| 2,535,735 A * | 12/1950 | De Villafranca et al. ...... 585/727 |
| 3,848,059 A | 11/1974 | Erneta |
| 4,130,632 A | 12/1978 | Braunsperger et al. |
| 5,066,472 A | 11/1991 | Ruff et al. |
| 5,246,682 A | 9/1993 | Ruff et al. |
| 2001/0053343 A1 | 12/2001 | Kohler et al. |
| 2008/0217012 A1 * | 9/2008 | Delorey et al. ............... 166/300 |

FOREIGN PATENT DOCUMENTS

| DE | 26 23 290 A1 | 12/1977 |
| DE | 32 111 28 A1 | 9/1983 |
| DE | 36 42 285 C1 | 6/1988 |
| EP | 0 527 309 A1 | 2/1993 |
| EP | 1 174 388 A1 | 1/2002 |
| GB | 666617 A | 2/1952 |
| GB | 2 139 262 A | 11/1984 |

OTHER PUBLICATIONS

PatBase abstract in English for DE 32 111 28 A1.
International Search Report for PCT/EP2009/055217.

* cited by examiner

*Primary Examiner* — Amina Khan
(74) *Attorney, Agent, or Firm* — Caesar, Rivise, Bernstein, Cohen & Pokotilow, Ltd.

(57) ABSTRACT

The invention relates to a method for hydrolyzing hydrolyzable metallic salts, the metallic salts being reacted with emulsions of a) water and b) an inert liquid.

9 Claims, No Drawings

METHOD FOR HYDROLYZING METALLIC SALTS WITH EMULSIONS

BACKGROUND OF THE INVENTION

The invention relates to a method for hydrolyzing hydrolyzable metallic salts with emulsions of water and inert liquid.

In the reaction of chlorosilanes of metallurgical silicon and HCl gas to give trichlorosilane (TCS) and silicon tetrachloride (STC), which are used, for example, as raw materials for the production of semiconductor-pure silicon, solar silicon and highly disperse silicic acid, metallic salts, mainly metallic chlorides, are formed as by-products. In particular, aluminum chloride and iron chloride deposit as a solid on cooling the reaction mixture. Selective deposition of the solids is important in terms of process technology in order to avoid changes in the distillative work-up of the liquid silanes. Various methods are known for the separation of the solid metallic chlorides from the process.

In DE 2623290 A1, the deposition of $AlCl_3$, mixed with $FeCl_3$ from the gaseous reaction mixture of chlorosilanes in Liebig tubes, is described. The cleaning of the Liebig tubes is not described.

Since the solids are generally mixtures of highly corrosive compounds, the immediately subsequent hydrolysis and optionally neutralization of the resulting aqueous solutions is preferred to a purification of the solids (for utilization). In the hydrolysis of the anhydrous metallic chlorides (in particular of the main constituent aluminum chloride), as is known a very high quantity of heat is released, which in the case of inadequate heat dissipation can lead to the evaporation of the water and as a result to uncontrolled pressure build-up and thus to dangerous plant conditions as far as to explosion.

For safety reasons, apparatus and plant components that are contaminated with these metallic chlorides are therefore dismantled for cleaning by hydrolysis. In addition to the danger of an accident on opening the plant and transport of the contaminated apparatus, this causes a high logistic complexity in order to avoid downtimes. The safety risks associated therewith and the cost are considerable.

As an alternative, for example, a method is described in EP 1174388 A1 in which the metallic chlorides are laboriously filtered off after precipitation in a quencher and thus isolated in utilizable form. Since generally, however, mixtures of metallic chlorides are concerned, here also the hydrolysis and subsequent disposal by means of a waste-water treatment plant is economically more advantageous than a further laborious purification. The hydrolysis can then be controlled by means of the feed rate of the filter cake.

The object was to hydrolyze solid hydrolyzable metallic salts in a simple and hazardless manner.

SUMMARY OF THE INVENTION

The invention relates to a method for hydrolyzing hydrolyzable metallic salts, in which the metallic salts are reacted with emulsions of a) water and b) inert liquid.

With the method according to the invention, the hydrolysis reaction can be carried out in a controlled manner. By means of the use of aqueous emulsions, the release of heat in the hydrolysis of the metallic salts can be delayed. A safe and cost-effective continuous cleaning off of metallic salt coatings on plant components in the installed state is thus possible.

DETAILED DESCRIPTION OF PREFERRED EMBODIMENTS

In the hydrolysis, an emulsion of water in an inert liquid is preferably brought into contact with the solid surface of the coating until the desired cleaning effect is achieved. This has the following advantages compared to the direct reaction with water:

On account of the droplet structure of the water, the reactive surface area is decreased. The exothermic hydrolysis then takes place markedly more slowly. By means of the proportion of water in the emulsion, the reaction rate can be adapted to the heat dissipation. By breaking the emulsion after the reaction, the inert liquid can be separated off from the aqueous phase enriched with hydrolysis products and thus recovered. This predestines the method according to the invention for a continuous operation mode.

The method is particularly suitable for the elimination of metallic salts adhering to surfaces. For example, apparatus, such as Liebig tubes, can be freed of adhering metallic salts by passing through an aqueous emulsion until the desired conversion is achieved. Complete cleaning can be detected with the aid of an indicator (e.g. pH electrode, temperature measurement, electrical conductivity measurement, thermal conductivity measurement, refractive index determination, density measurement) directly on the emulsion flowing out or on the already separated aqueous phase, such that the process can also be simply automated.

The optimum concentration of water in the emulsion can be determined by simple preliminary tests, customarily beginning, in particular with strongly exothermic hydrolysis processes, with a low water concentration in order to avoid undesired overheating. It is also possible, in the case of known reaction enthalpy, heat dissipation and heat capacity, to calculate the optimum mixture for a desired or permissible temperature increase. The proportion of water in the emulsion can preferably vary from 0.5 to 80% by weight, preferably the range is from 10 to 50% by weight, particularly preferably 15 to 35% by weight. With very low concentrations, it takes longer until the hydrolysis is complete; on the other hand, with an excessively high proportion of water a destabilization of the emulsion and an undesirably high temperature increase can occur. It can therefore be advantageous to add an emulsifier for the stabilization of the emulsion.

Possible metallic salts are, for example, halides of aluminum, iron, titanium and chromium, in particular aluminum chloride and iron chloride.

In the hydrolysis of aluminum chloride coatings from silane production, hydrochloric acid solutions are formed, so that in these cases an emulsifier is preferably used that is chemically stable in the acidic medium. Examples of emulsifiers of this type are sulfonic acid, phosphonic acid and polyethylene glycol derivatives, which can also be used as a mixture. Particularly preferred emulsifiers here are those that form poorly soluble products with aluminum ions, such as dodecylbenzenesulfonic acid, such that—with adequately high concentration—although a stabilization of the emulsion is maintained during the hydrolysis process, as a result of the precipitation of the emulsifier an easier separation of the emulsion is made possible at the end of the process. The concentration of emulsifier in the mixture is customarily 0.01 to 10% by weight, preferably 0.1 to 2% by weight, particularly preferably 0.1 to 1% by weight.

As an inert liquid, liquids only poorly soluble in water are preferred, which do not react with the metallic salt coatings or the hydrolysis products under the chosen conditions. Preferably, the inert liquids are liquid at 10° C. Organopolysiloxanes are preferred, such as cyclic or linear polydimethylsiloxanes or hydrocarbons such as paraffin oils, toluene, polyalkylbenzenes. Polydimethylsiloxanes are particularly preferred, like commercially obtainable linear polydimethylsiloxanes, for example $Me_3Si-O(SiMe_2O)_m-SiMe_3$, where m=10 to 40, or mixtures of cyclic $(Me_2SiO)_n$, where n=4 to 6. However, mixtures of inert liquids can also be employed.

Preferably, the inert liquids have a viscosity of 0.5 to 1000 mPas, in particular 10 to 50 mPas, at 20° C.

The emulsifying process is preferably brought about either by a mechanical mixing device typical in emulsifying practice, such as a dissolver, or by a pump, which is simultaneously utilized as a feed system. The emulsion can either be prepared ahead and intermediately stored in a container or freshly prepared immediately before use.

The hydrolysis process can in principle be carried out at temperatures from 0° C. to 100° C. However, higher temperatures are also conceivable provided the evaporation of the water is prevented by realization of overpressure. Customary practice is reaction at normal pressure in the temperature range below 80° C., in order that an adequate temperature interval to the boiling point of the water is guaranteed and a pressure build-up can be prevented.

The method can be designed to be batchwise or continuous. In the batch process, the metallic salt to be hydrolyzed is either initially introduced into a suitable container and the emulsion is added or the emulsion is initially introduced and the metallic salt is added in a controlled manner by means of a solid metering or conveyor device (e.g. screw conveyor, solids lock). Preferably, the method according to the invention is operated continuously in production plants. The apparatus to be cleaned (pipelines such as Liebig tubes, containers, etc.) are rinsed here with the emulsion, if possible in the installed state. For this, they are preferably connected to the emulsion supply device via fixed pipeline connections. By this means, emissions into the atmosphere can be avoided. The method according to the invention, however, can also be carried out on dismantled apparatus, which are connected to a special device (cleaning stand) and rinsed through with the emulsion. The rinsing process is preferably carried out by feeding the emulsion by means of a pump (membrane pump, rotary pump, canned motor pump, gear pump, reciprocating pump, etc.). This optionally has the advantage that emulsifying and conveying processes can take place in a single step provided the conveyor unit makes possible a sufficiently intensive mixing of the components. In these cases, water and (optionally recycled) inert liquid and optionally emulsifier are preferably combined in a mixing section, fed to the suction side of a pump, conveyed by the pump and at the same time emulsified here. The conveying of the emulsion through the plant components to be cleaned, however, can also take place by build-up of a hydrostatic pressure, e.g. by means of high-level tanks or by applying a gas pressure (e.g. compressed air, nitrogen). In these cases, the emulsion, however, must either have been prepared beforehand, or the dispersing system connected upstream of the apparatus to be cleaned.

The throughput of the emulsion is preferably chosen such that the cleaning takes place as rapidly and as safely as possible. It depends both on the water concentration in the emulsion and also on the process temperature and the stability of the emulsion. The optimum process parameters can be determined by simple preliminary experiments, e.g. by measurement of the temperature at the outlet of the rinsing liquid. Advantageously, water concentrations as low as possible will initially be employed here in order to avoid undesired overheating.

For economic reasons, it can be advantageous to recover the inert emulsion constituent again. For this, the emulsion obtained in the cleaning process is broken using the customary methods (e.g. addition of a salt, passing over a separator/ coalescer filled with glass cloth), the aqueous phase is separated off and water and optionally emulsifier is admixed again to the inert liquid.

In the following examples and comparison examples, if not stated otherwise in each case, all quantitative and percentage details are based on the weight and all reactions are carried out at a pressure of 0.10 MPa (abs.) and a temperature of 20° C.

Example 1

Continuous Method

In a test stand, silicone oil AK35 (polydimethylsiloxane with a viscosity of 35 mPas, purchasable from Wacker Chemie AG) from a receiver vessel and water in the ratio of 4:1 with addition of 0.5% dodecylbenzenesulfonic acid are mixed in a rotary pump acting as a dissolver and simultaneously conveyed. The resulting emulsion is pumped through the Liebig tube coated with 60 kg of aluminum chloride at a throughput of 100 kg/h until the complete dissolution of the coating. In a coalescer connected downstream and filled with glass cloth, the mixture flowing out is separated into an aqueous phase and a silicone oil phase. The aqueous phase contains yellowish spongy particles; it is led off through an adsorber made of active carbon to the waste-water treatment plant and the silicone oil phase is led back to the receiver vessel. The quantity of waste water continuously drawn off from the separator is permanently replaced by fresh water. The reaction is carried out at ambient temperature (18° C.). The mixture emerging has warmed to 34° C. without additional cooling of the tube. After 1 hour and 55 minutes, a pH difference between the feed and outlet is no longer determinable and the coating is completely detached. By rinsing for 10 minutes with 1000 kg/h of water, silicone oil residues adhering in the interior of the tube are completely removed, as the wiping test with a paper tissue shows.

Example 2

Batch Test

A mixture of 109 g of water and 313.5 g of silicone oil AK35 is initially introduced into a 600 ml beaker and emulsified for 20 sec with a dispersing rod (Ultraturrax). Subsequently, the emulsion is stirred at 220 rpm with a blade stirrer and treated with a metallic chloride fragment 14 g in weight from chlorosilane production (aluminum chloride). The temperature increases from 23° C. within 16 minutes to a maximum value of 44° C. and, after the solid has completely dissolved after 32 minutes, has decreased again to 40° C.

Example 3

Batch Test

A mixture of 105.3 g of water, 302.4 g of silicone oil AK35 and 1.5 g of Marlon® AS3 acid (=dodecylbenzenesulfonic acid) is initially introduced into a 600 ml beaker and emulsified for 20 sec with a dispersing rod (Ultraturrax). Subsequently, the emulsion is stirred at 220 rpm with a blade stirrer and treated with a metallic chloride fragment from chlorosilane production (aluminum chloride) 13.5 g in weight. The temperature increases from 23° C. within 30 minutes to a maximum value of 46° C. and, after the solid has completely dissolved after 30 minutes, has decreased again to 39° C.

Comparison Example to Example 3 (not According to the Invention)

196.6 g of water are initially introduced into a 600 ml beaker. A metallic chloride fragment from chlorosilane production (aluminum chloride) 12.6 g in weight is added with stirring with the blade stirrer at 220 rpm. The temperature increases from 23° C. within 30 seconds to a maximum value of 54° C. and, until the solid has completely dissolved after 1 minute, has decreased again to 53° C.

The invention claimed is:

1. A method for cleaning off a hydrolyzable metallic salt coating on a plant component in an installed state, said method comprising:
    providing the plant component in the installed state, wherein the plant component is coated with a hydrolyzable metallic salt selected from the group consisting of aluminum halides, iron halides, titanium halides and chromium halides;
    providing an emulsion consisting of: (a) water and (b) an inert liquid selected from the group consisting of organo-polysiloxanes, hydrocarbons and mixtures thereof; and
    reacting the hydrolyzable metallic salt with the emulsion to hydrolyze the hydrolyzable metallic salt,
    whereby the hydrolyzable metallic salt coating is cleaned off the plant component in the installed state.

2. The method as claimed in claim 1, wherein a proportion of water in the emulsion is 10 to 50% by weight.

3. The method as claimed in claim 1, wherein the hydrolyzable metallic salt is aluminum chloride.

4. The method as claimed in claim 1, wherein the inert liquid has a viscosity of 0.5 to 1000 mPas at 20° C.

5. The method as claimed in claim 2, wherein the hydrolyzable metallic salt is aluminum chloride.

6. The method as claimed in claim 2, wherein the inert liquid has a viscosity of 0.5 to 1000 mPas at 20° C.

7. The method as claimed in claim 3, wherein the inert liquid has a viscosity of 0.5 to 1000 mPas at 20° C.

8. The method as claimed in claim 7, wherein a proportion of water in the emulsion is 10 to 50% by weight.

9. The method of claim 1, wherein the plant component is at least one member selected from the group consisting of pipelines and vessels.

* * * * *